April 20, 1965    D. D. GOSS    3,178,929
METHOD AND APPARATUS FOR TESTING MEAT
Filed Oct. 26, 1962    2 Sheets-Sheet 1

INVENTOR.
DONALD D. GOSS
BY *Kenway, Jenney & Hildreth*
ATTORNEYS

April 20, 1965    D. D. GOSS    3,178,929
METHOD AND APPARATUS FOR TESTING MEAT
Filed Oct. 26, 1962    2 Sheets-Sheet 2

A.O.A.C. Fat Content, %

Measured Volume of Fat

INVENTOR.
DONALD D. GOSS
BY
ATTORNEYS

_United States Patent Office_

3,178,929
Patented Apr. 20, 1965

3,178,929
METHOD AND APPARATUS FOR TESTING MEAT
Donald D. Goss, Marblehead, Mass., assignor to Dunn-Right, Incorporated, Mansfield, Mass., a corporation of Massachusetts
Filed Oct. 26, 1962, Ser. No. 233,278
8 Claims. (Cl. 73—15.4)

My invention relates to the testing of meat, and more particularly, to an improved method for testing the fat content of meat and to novel apparatus for carrying out the method.

Present tendencies in the producing and marketing of food are towards standardized items of graded constant quality. In particular, single cuts of meat are graded in accordance with selected characteristics, such as their appearance, texture, and proportion and distribution of bone and fat. The different cuts of meat may be appraised visually, by those skilled in the art, and assigned with little difficulty to the various categories which have been established. In the case of ground meat, however, appraisal is made more difficult by the fact that the appearance of ground meat may not change appreciably with varying fat content, so that two given samples of the same general appearance and texture will prove to be of entirely different quality when cooked. In order to assure some uniformity in the ground meat offered to purchasers, specific standards have been established which must be maintained by purveyors of ground meat, on penalty of legal action for failure to observe them. Specifically, in the case of ground beef, commonly known as hamburger, a widely accepted standard is that this product must not contain more than 30 percent by weight of fat. The standard method of testing the fat content of ground beef is by chemical analysis, involving a complete ether extraction of the fat in a weighed sample; details of the procedure are set out in chapter 23, paragraph 23.005 of the Official Methods of Analysis of the Association of Official Agricultural Chemists, 9th edition, published in 1960 by the Association of Official Agricultural Chemists, P.O. Box 540, Benjamin Franklin Station, Washington 4, D.C. These tests are relatively expensive and time consuming, and it may take weeks for an individual purveyor of meat to obtain test results from a laboratory equipped to carry them out. Accordingly, they are not practical for the day to day evaluation of batches of ground beef, nor are they of any assistance in preparing a supply of ground meat. For this reason, it is common for those engaged in the preparation of ground meat to aim by rough visual methods at a fat content of approximately 20 percent, so that the legal maximum will never be exceeded. However, it would be desirable to raise the fat content of this product, not only from the standpoint of economy, but because an entirely satisfactory product may be produced by incorporating fat in any amounts short of the prescribed maximum. Moreover, it would be desirable to produce batches of meat from day to day which were constant in their fat content, so that a uniform quality product could be produced, and different grades within the permissible specifications could be established. It is the object of my invention to facilitate the preparation of ground meat with accurately controlled fat content.

My invention is based on the discovery that an accurate determination of the fat content of ground meat may be made by compressing a predetermined volume of ground meat between two electrodes comprising electrically conducting plates, spaced a fixed distance apart, applying a predetermined voltage between the plates, and maintaining the voltage between the plates until the resistance of the sample is increased to the point at which substantially no current flows. The drippings from the sample so treated are collected, and are found to separate into two layers; a lower watery layer of meat juices, and a layer of fat above the watery layer. The volume of this fat layer has been found to be a predictable function of the fat content of the meat as determined by the more elaborate procedures of chemical analysis. I have devised a novel apparatus for carrying out this process in a simple and reproducible fashion, such that a spot test on a sample of meat may be run in approximately 2 to 3 minutes, whereby quality control may be imposed on the production of ground meat as it is made.

Basically, the novel apparatus of my invention comprises a cartridge in which a known volume of meat may be placed and held in contact with opposed conductive plates which are maintained a fixed distance apart. A housing is provided into which the cartridge may be inserted, the housing enclosing a transformer for reducing commonly available alternating current line voltages to a suitable voltage for carrying out the process of my invention. Connections are provided between the transformer and the conducting plates in the receptacle when the receptacle is inserted in the housing. A downwardly inclined spout is provided in the cartridge, to collect the fat and juices expressed from the meat during the process of my invention and deliver them to a collecting vial, which is mounted on a suitable support on the housing. In accordance with a preferred embodiment of the testing apparatus of my invention, the spout is formed by a flexible portion of the cartridge, which also serves as a hinge joining opposite side members of the receptacle together for movement between open and closed positions. Preferably, a movable graduated scale is slidably mounted on the housing adjacent the vial, so that the height of the column of fat in the vial may be readily measured after the fat and juices have been expelled from the meat in the manner characteristic of the process of my invention.

My invention will best be understood in the light of the accompanying drawings, together with the following detailed description, of the preferred mode of carrying out the process, and the preferred embodiment of the apparatus for facilitating the process, of my invention.

In the drawings, FIGURE 1 is a front view of apparatus in accordance with preferred embodiment of my invention;

Figure 1:
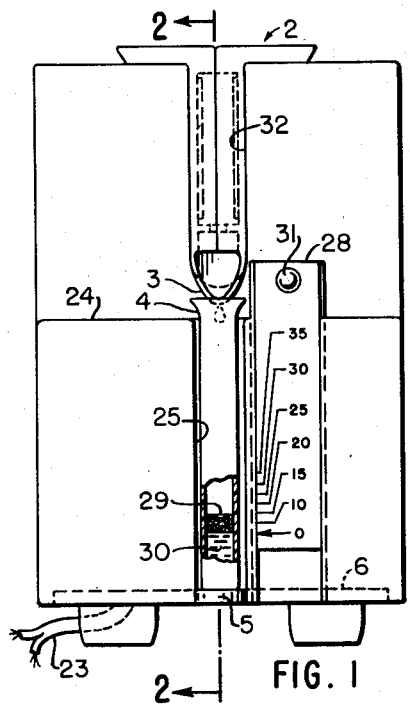
Figure 2:
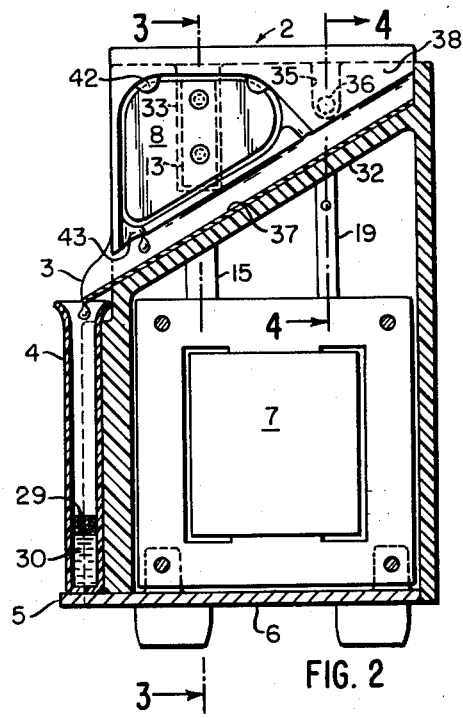
FIGURE 2 is a cross-sectional elevational view of the apparatus of FIGURE 1 taken essentially along the lines 2—2 in FIGURE 1.

Referring first to FIGURE 1, the apparatus of my invention is shown to comprise a housing 1, in which a cartridge 2 may be inserted to test a sample of meat placed therein. The cartridge 2 is formed with a spout 3, as best shown in FIGURE 2, to collect the fat and the juices expressed from the meat in the process of my invention and deliver them to a vial 4, which is mounted on a suitable shelf 5 formed as an extension on the bottom plate 6 of the housing. Conveniently, the housing and its bottom plate may be made of any suitable conventional insulating synthetic resin, preferably of the thermosetting type, such as the phenol-formaldehyde resins, the epoxy resins, and the like. However, it may also be made of metal, if desired, providing that the necessary insulation is provided. As shown, the housing 1 also provides for the enclosure and support of a conventional step-down transformer 7.

Figure 6:
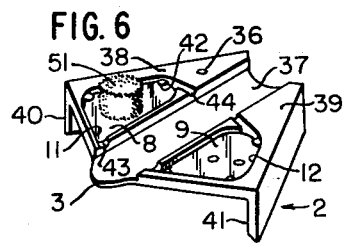
FIGURE 6 is a perspective view of the cartridge of the apparatus shown in FIGURE 1 shown folded open in condition to receive a sample of meat to be tested.

Referring now to FIG. 6, the cartridge 2 is shown folded to its open position. The cartridge may comprise a single piece of polyethylene, polypropylene or the like of the type well known in the art as suitable for hinge construction. Specifically, I prefer to use a crystalline polymer of propylene having a specific gravity of between 0.90 and 0.91, a refractive index of 1.49, a tensile strength of between 4300 and 5700 p.s.i., a percent elongation of 250 to 700 percent, a modulus of elasticity in tension of $1.3 \times 10^5$ to $2 \times 10^5$ p.s.i., a compressive strength of 8500 to 10,000 p.s.i., and a Rockwell Hardness of 85 to 110. One suitable flexible plastic of this type is Tenite polypropylene 4D31A, made by the Eastman Kodak Company. Polypropylene, or polyethylene of similar properties, is highly suitable for use in the cartridge of my invention, since it may be flexed indefinitely without cracking, is not wet by the fats and juices expressed from the meat in the process of my invention, and is unaffected by the temperatures to which it is exposed in my process; it may be continuously heated at temperatures between 275 and 320° F., without change.

As shown in FIG. 6, the polypropylene portion of the receptacle 2 comprises four portions. First, there is a central portion 37 of reduced thickness, which serves as a hinge and collecting trough and on which is formed the spout 3. Adjoining the central portion are two side plates 38 and 39, in which recesses 11 and 12, respectively, are formed to define a chamber to receive a sample of ground meat to be tested. The electrode plates 8 and 9 are placed in these recesses as shown, and may be releasably retained by tabs such as 42 formed at the sides of the recesses, so that the plates may be removed for cleaning when desired. A flange 40 is formed on the side plate 38, and a corresponding flange 41 is formed on the side plate 39, to support the cartridge in the housing and serve as handles for the cartridge. In use, these flanges may conveniently be gripped between the fingers of one hand when inserting the cartridge in the housing or removing it therefrom.

The recesses such as 11 are each provided with a lower channel such as 43, through which the liquids expressed from the meat may flow, and an upper channel such as 44 for the release of steam. The steam is desirably directed into the trough formed by the hinged portion 37, to aid in keeping the expressed fat melted, thus facilitating its flow into the vial 4.

Figure 3:
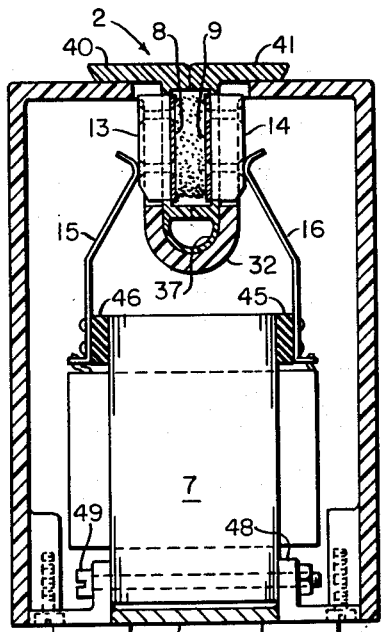
FIGURE 3 is a sectional view of the apparatus of FIGS. 1 and 2, taken essentially along the lines 3—3 in FIGURE 2.
Figure 4:
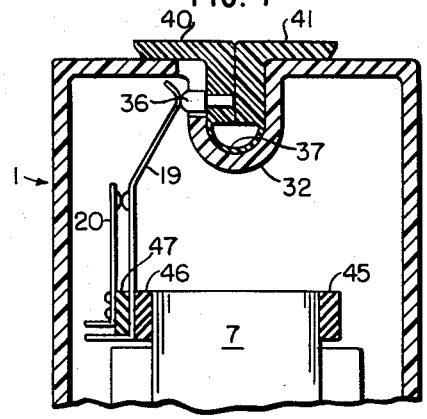
FIGURE 4 is a cross-sectional view of a portion of the apparatus of FIGS. 1–3, taken essentially along the lines 4—4 in FIGURE 2.
Figure 7:
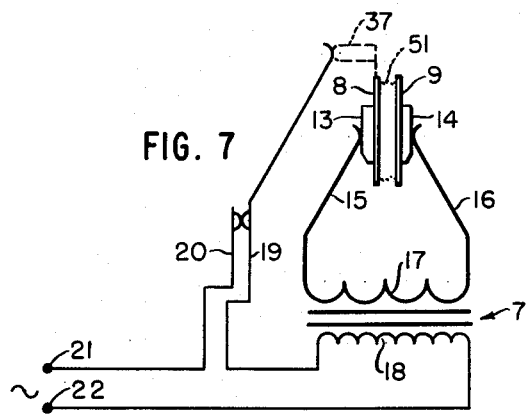
FIGURE 7 is a schematic wiring diagram of the apparatus of my invention.

Referring now to FIGURE 7, the electrical circuit incorporated in the apparatus shown in FIGURES 1 through 5 comprises means for applying a voltage between the plates 8 and 9 when the cartridge 2 is inserted in the housing 1. Comparing FIGURES 3 and 7, the plates 8 and 9 are each connected to a conductive contact in the form of a guide bar, plate 8 being connected to a contact 13 and plate 9 being connected to a contact 14, as by rivets or the like. When the container 2 is inserted in the housing 1, contacts 13 and 14 engage resilient contact fingers 15 and 16 respectively, which are connected to the terminals of a secondary winding 17 on the transformer 7. As shown in FIGURES 4 and 7, the primary winding 18 of the transformer is connected through a pair of resilient contacts 19 and 20, which are closed when the container 2 is inserted in the housing 1, to a pair of terminals 21 and 22 of a suitable alternating voltage supply. As shown in FIGURE 1, this connection to the terminals 21 and 22 may take the form of a cord 23, which may be connected to a conventional plug, not shown, for connection to any convenient electrical outlet.

Figure 5:
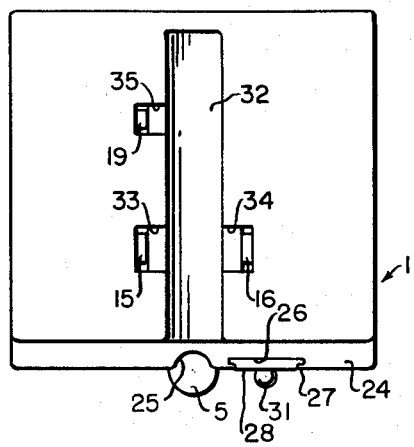
FIGURE 5 is a plan view of the apparatus of FIGURE 1.

Referring now to FIGURES 1 and 5, the housing 1 is provided with a projecting ledge 24, which is grooved as at 25 to receive the vial 4, and is provided with a slot 26 having projecting flanges such as 27 to receive a vertically slidable scale 28. This scale may be suitably calibrated as desired, and includes a zero index mark which is slidable into register with the bottom meniscus of the layer 29 of fat which is collected in the process of my invention, and which overlies a layer 30 of watery juices. The top meniscus of the layer 29 is then measured against the scale, which may be calibrated directly in terms of the fat content of the meat, in a manner which will appear.

The scale 28 may be provided with a suitable knob 31 to facilitate manipulation of the slide, if so desired.

In order to protect the transformer 7 from possible damage or shorting due to juices or fat from the cartridge, the enclosure of the transformer is completed by a channel shaped wall 32, which forms a recess into which the cartridge 2 is received. As best shown in FIGURE 5, the channel 32 is provided with grooves, such as 33 and 34, to receive the contact bars 13 and 14, respectively, and is provided with an additional slot 35, to receive an actuating stud 36 mounted on one side of the container 22. The stud 36 serves to actuate the contact 19 into engagement with the contact 20 to complete the primary circuit for the transformer 7 when the container is inserted.

Referring now to FIGURES 3 and 4, the electrical connections necessary to complete the circuit described in connection with FIGURE 7 may conveniently be made by mounting the resilient contacts 15, 16, 19 and 20 on insulating members secured to the frame of the transformer 7. Thus, the contact 16 is secured to an insulating block 45, the contacts 15 and 19 are secured to an insulating block 46, and the contact 20 is secured to the block 46 through an intermediate insulating block 47, as shown in FIGURE 4. The transformer 7 is secured to the bottom plate 6 by means of lugs such as 48, formed on the bottom plate 6, and a through bolt 49, so that the entire electrical assembly of the apparatus may be removed by removing the bottom plate to withdraw the transformer and its contacts.

Figure 8:
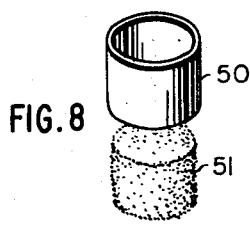
FIGURE 8 is a perspective view of a sampling ring employed in the process of my invention.

The mode of carrying out the process of my invention will next be described, in connection with a description of the operation of the apparatus of FIGURES 1 through 7 and the sampling technique illustrated in FIGURE 8. As shown in FIGURE 8, a sample of predetermined volume is conveniently collected by means of a ring 50 of any suitable metal, plastic or the like, which is designed to contain a sample 51 of ground meat of such size that when compressed within the plates 8 and 9 of the cartridge 2, it will leave space around the meat cake for fat, juices and steam to escape. The sampling is done simply by inserting the cylindrical ring 50 into the meat to be tested, and packing into it sufficient meat to fill it. The meat is then cleanly cut off at the ends, and the sample is transferred by extrusion into the cartridge 2, the latter being folded open as shown in FIGURE 6. The cartridge 2 is then folded together to compress the meat between the electrode plates 8 and 9, and the cartridge 2 is placed in the housing 1, whereby the contacts 13 and 14 engage the contacts 15 and 16, respectively, and the stud 36, shown in FIGURE 4, moves the contact 19 into engagement with the contact 20. It will be seen that the apparatus is safely disconnected when the cartridge 2 is removed. As soon as the cartridge is inserted, a voltage, in the range of 10 to 30 volts, is applied across the plates 8 and 9. I have found that if the sample thickness is about one-fourth of an inch, and approximately 16 volts is applied, the processing time will be about 3 minutes. At 20 volts, the corresponding time would be about 2 minutes. During this time, a reproducible quantity of fat will be expressed from the meat. In contrast with the ether extraction method prescribed by the A.O.A.C. testing procedure, which extracts essentially all of the fat from the meat, the process of my invention extracts only approximately 15 to 20 percent. However, in apparatus of fixed dimensions, this percentage will be consistently reproducible over a series of samples. Accordingly, a definite correlation is found between the volume expressed and the fat content of the meat as determined by the A.O.A.C. method.

Figure 9:
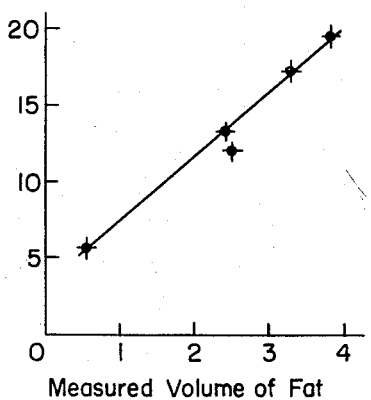
FIGURE 9 is a graph showing the relationship between the volume of fat collected in the process of my invention and the fat content of the ground meat tested in the process.

When the voltage is first applied, current begins to flow through the meat, increasing up to a maximum of, typically, 3 to 5 amperes, and then decreasing as the meat becomes dried out. As the meat dries out further, its resistance goes up, eventually reaching a value so high that negligible current flows. During this time, the juices flow down through grooves 43 in the manner illustrated in FIGURE 2, so that the trough 37 carries the juices out through the spout 3 to the vial 4. As noted above, the column of fat expressed from ground meat of the same fat content will be found to be the same for different samples. However, the length of the column of juices 30 may vary considerably from sample to sample, and may be ignored. This is conveniently done with the apparatus of my invention by adjusting slide 28 to put the zero reference mark adjacent the bottom meniscus of the fat column 29. The upper meniscus is then read against a set scale which may be calibrated directly in terms of the fat content of the sample. FIGURE 9 shows the results of an actual comparison of tests made with meat samples of varying fat content. Each batch of meat was sampled and tested by the A.O.A.C. method described in the publication cited above, and also tested in the apparatus of my invention to determine the volume of fat expressed, in terms of the height of the column in the testing vial. Of the five examples given, four show remarkably close agreement with the A.O.A.C. method, and the fifth one, while departing somewhat from the line defined by the other four, was still close enough to give valuable information sufficient to make it possible to compound meat with much greater precision than is possible by the methods previously used for the purpose.

While the dimensions of the apparatus of my invention are not critical, the apparatus is conveniently proportioned to utilize meat samples of from one-half ounce to one ounce in weight, the size of the recesses and the plates in the cartridge being proportioned to accommodate a sample of the corresponding volume with ample room around the edges for escape of steam, fat and juices. The angle of the trough formed in the cartridge by the hinge portion 37 with respect to the gravitational horizontal is not especially critical, but I have found that at angles of 30° and more, the fluids flow freely down the trough, whereas at lesser angles, the channel is apt to clog.

While I have described the process and apparatus of my invention with regard to various specific details, many changes and variations will be apparent to those skilled in the art upon reading my description, and such may obviously be made without departing from my invention.

Having thus described my invention, what I claim is:

1. The method of determining the fat content of ground meat, comprising the steps of placing a sample of the meat of predetermined volume between two electrodes spaced a predetermined distance apart, expressing fat and juices from the sample by applying a predetermined voltage to the electrodes to pass current through the sample until the resistance of the sample increases sufficiently to substantially stop the flow of current, collecting the fat expressed from the sample, and measuring the amount of the fat collected.

2. The method of determining the fat content of ground meat, comprising the steps of compressing a sample of ground meat of predetermined volume between two spaced electrodes, cooking fat and juices out of the sample by applying a predetermined voltage between the electrodes for a time sufficient for the current flowing hrough the electrodes to diminish substantially to zero, and measuring the amount of the fat cooked out of the sample.

3. The method of determining the fat content of ground meat comprising the steps of placing a predetermined volume of ground meat between two electrodes spaced a predetermined distance apart, applying a voltage between 10 and 30 volts to the electrodes until fat and juices are no longer expressed, collecting the fat expressed from the sample, and measuring its volume to determine the fat content of the sample.

4. The method of determining the fat content of ground meat comprising the steps of filling a form of predetermined volume with a sample of ground meat to be tested, removing the sample from the form and placing it between two plane electrodes having a predetermined separation, applying a predetermined voltage across the electrodes for a time sufficient to permit the current flowing between the electrodes to diminish substantially to zero, collecting the fat expressed from the sample, and measuring the amount of the collected fat.

5. Apparatus for determining the fat content of ground meat, comprising a collecting vial, a scale calibrated in divisions representing increments of volume in said vial and movably mounted adjacent said vial to facilitate the measurement of the volume of a column of fat suspended in the vial by a column of watery meat juices, a trough mounted above the vial, said trough being inclined downwardly and terminating at its lower end in a spout positioned to deliver liquid to the vial, a pair of spaced electrodes mounted a predetermined distance apart and located above the trough in position to hold a sample of ground meat compresesd between them above the trough, and means for applying a predetermined voltage to the electrodes to cook out fat and juices from the sample and deliver them to the trough.

6. An apparatus for testing the fat content of a meat sample, comprising: a housing; a cartridge receivable in said housing and comprising two relatively separable parts cooperating in assembled relation to define a recess therebetween and an inclined spout communicating with said recess for draining liquid therefrom; a pair of plane elecrodes each mounted in one of said parts and being enclosed within said recess and spaced apart a predetermined distance in said assembled relation, such that a meat sample may be enclosed in said recess in contact with said electrodes; means for applying a predetermined voltage across asid electrodes, said means contacting said elecrodes in the assembled relation of said cartridge in said housing; and means for collecting liquid draining from said spout.

7. An apparatus as recited in claim 6, in which said cartridge includes a flexible hinge portion connecting said separable parts in folding relation, said hinge portion comprising said spout.

8. An apparatus as recited in claim 6, in which said housing is formed with a channel for insertion of said cartridge by a relative movement in a predetermined path, said cartridge including protruding contacts and said housing further being formed with slots for receiving said contacts and guiding said cartridge along said predetermined path to engage said contacts with said voltage-applying means in the assembled relation of said cartridge in said housing.

References Cited by the Examiner

UNITED STATES PATENTS 1,994,894  3/35  Marcotte _____ 99—358
2,361,844  10/44  Horner _____ 73—76

FOREIGN PATENTS 293,166  9/53  Sweden.

RICHARD C. QUEISSER, *Primary Examiner.*